United States Patent [19]

Laval, Jr.

[11] 4,305,825

[45] Dec. 15, 1981

[54] REACTION MEMBER FOR A FLUID SEPARATING DEVICE

[76] Inventor: Claude C. Laval, Jr., 2444 N. Farris Ave., Fresno, Calif. 93704

[21] Appl. No.: 179,684

[22] Filed: Aug. 20, 1980

[51] Int. Cl.³ .............. B01D 21/26

[52] U.S. Cl. .............. 210/512.1; 209/211

[58] Field of Search .............. 210/512.1; 209/211

[56] References Cited

U.S. PATENT DOCUMENTS

| | | | |
|---|---|---|---|
| 3,289,608 | 12/1966 | Laval, Jr. | 210/512 R |
| 3,378,993 | 4/1968 | Veres et al. | 210/512.1 |
| 3,512,651 | 5/1970 | Laval, Jr. | 210/512 R |
| 3,753,336 | 8/1973 | Drew et al. | 210/512.1 |
| 3,928,186 | 12/1975 | Zemanek | 209/211 |
| 3,947,364 | 3/1976 | Laval, Jr. | 210/512 R |
| 4,062,766 | 12/1977 | Duesling | 209/211 |
| 4,120,795 | 10/1978 | Laval, Jr. | 210/512 R |
| 4,147,630 | 4/1979 | Laval, Jr. | 210/512 R |
| 4,149,861 | 4/1979 | Sogo et al. | 210/512.1 |
| 4,221,655 | 9/1980 | Nakayama et al. | 209/211 |

*Primary Examiner*—Theodore A. Granger
*Attorney, Agent, or Firm*—Huebner & Worrel

[57] ABSTRACT

A concavo-convex reaction member for use in a device for centrifuging separation into a receiver of a heavier, particulate constituent of a fluid system from a lighter, fluid constituent, the system swirling downwardly in a chamber wherein the member is disposed to reflect a swirl of the lighter constituent upwardly after separation of a portion of the heavier constituent with particles of the heavier constituent tending to settle on the member and to become mixed with the upward swirl, the member providing a convex, downwardly and outwardly sloping upper surface which sheds such particles downwardly into the receiver and providing a concave surface disposed toward the receiver to obstruct movement of separated heavier constituent upwardly therefrom.

2 Claims, 5 Drawing Figures

REACTION MEMBER FOR A FLUID SEPARATING DEVICE

BACKGROUND OF THE INVENTION

1. Field of the Invention

The present invention relates to a reaction member for a fluid separating device, and more specifically to such a member which reflects a swirl of fluid for centrifuging separation of constituents of differing specific gravities in a fluid system.

2. Description of the Prior Art

The prior art includes a variety of devices for centrifuging separation of constituents of differing specific gravities in a fluid system. Many of these devices are effective in performing such separation from the standpoints of purity of separated constituents, minimal waste of a desired constituent, pressure drop through the device, and initial cost. However, when large quantities of a desired constituent are handled, even a relatively small proportion of an undesired constituent becomes troublesome as exemplified by the clogging and wear of pumps, nozzles, and other elements in a domestic or agricultural water supply system supplied with water having unwanted particulate matter. Furthermore, in an era of limited resources, wastage must be reduced to a minimum. Therefore, any improvement in the degree of separation attained by a fluid separating device is advantageous if such improvement can be obtained without significant adverse effect on the balancing factors of the cost and the durability of the device and the pressure drop through it.

A significant advance in the art of fluid separating devices is disclosed in the applicant's U.S. Pat. No. 3,512,651, issued on May 9, 1970, a copy of which is submitted herewith in connection with the Prior Art Statement. The improvement of the present invention is an advance over a planar reaction plate shown in FIG. 2 of this patent and identified by the numeral 66. The plate has a substantially flat upper surface disposed centrally in a vortexing chamber of such a device. The surface defines a point in the chamber at which a downward swirl therein of a lighter, desired constituent of a fluid system reverses so that contamination of such constituent by an undesired heavier particulate constituent moving along the walls of the chamber is minimized. The reaction plate effectively defines this point and minimizes such contamination. However, a limited quantity of undesired particles collects on the upper surface of the plate and is carried away by the reflected swirl of the desired constituent. Therefore, even more effective separation is obtained when such collection of undesired particles on the upper surface does not occur. These and other advantages of the present invention will subsequently become apparent in the description in the specification.

PRIOR ART STATEMENT

Characterizing the closest prior art of which the applicant is aware and in compliance with 37 C.F.R. § 1.97 and § 1.98, attention is invited to the following patents issued to the applicant, copies of which are submitted with this application.

U.S. Pat. No. 3,289,608—=Dec. 6, 1966;

U.S. Pat. No. 3,512,651—=May 19, 1970;

U.S. Pat. No. 4,120,795—=Oct. 17, 1978.

These patents are believed relevant in their disclosure of fluid separating devices wherein a fluid swirls axially of a vortexing chamber downwardly and then upwardly. U.S. Pat. Nos. 3,512,651 and 4,120,795 have additional relevancy in their disclosure of a reaction plate to reflect the swirl upwardly. However, the disclosed reaction plates are planar and the plates depicted in FIGS. 4 and 11 of U.S. Pat. No. 4,120,795 are perforate and are juxtaposed to an auxiliary separating device. The auxiliary device has a frusto-conical peripheral surface which is nearly parallel to an enclosing, cylindrical sidewall and does not participate significantly in the swirl reflecting functions of the plate.

SUMMARY OF THE INVENTION

It is an object of the present invention to provide an improved reaction member for a fluid separating device wherein the member reflects a swirl of a lighter constituent of a fluid system without accumulating any significant quantity of a heavier constituent.

Another object is to provide such a member configured to obstruct movement of the separated heavier constituent from a receiver disposed oppositely of the member from the swirl.

Another object is to provide such a member adapted for use in a fluid separator instead of a prior art reaction member without substantial alteration of the balance of the separator.

A further object is to provide such an improved reaction member which is economical, durable, provides superior separation to prior art reaction members without increased pressure drop, and is fully effective in performing its intended purpose.

DESCRIPTION OF THE PREFERRED EMBODIMENT

FIRST FORM

Figure 1:
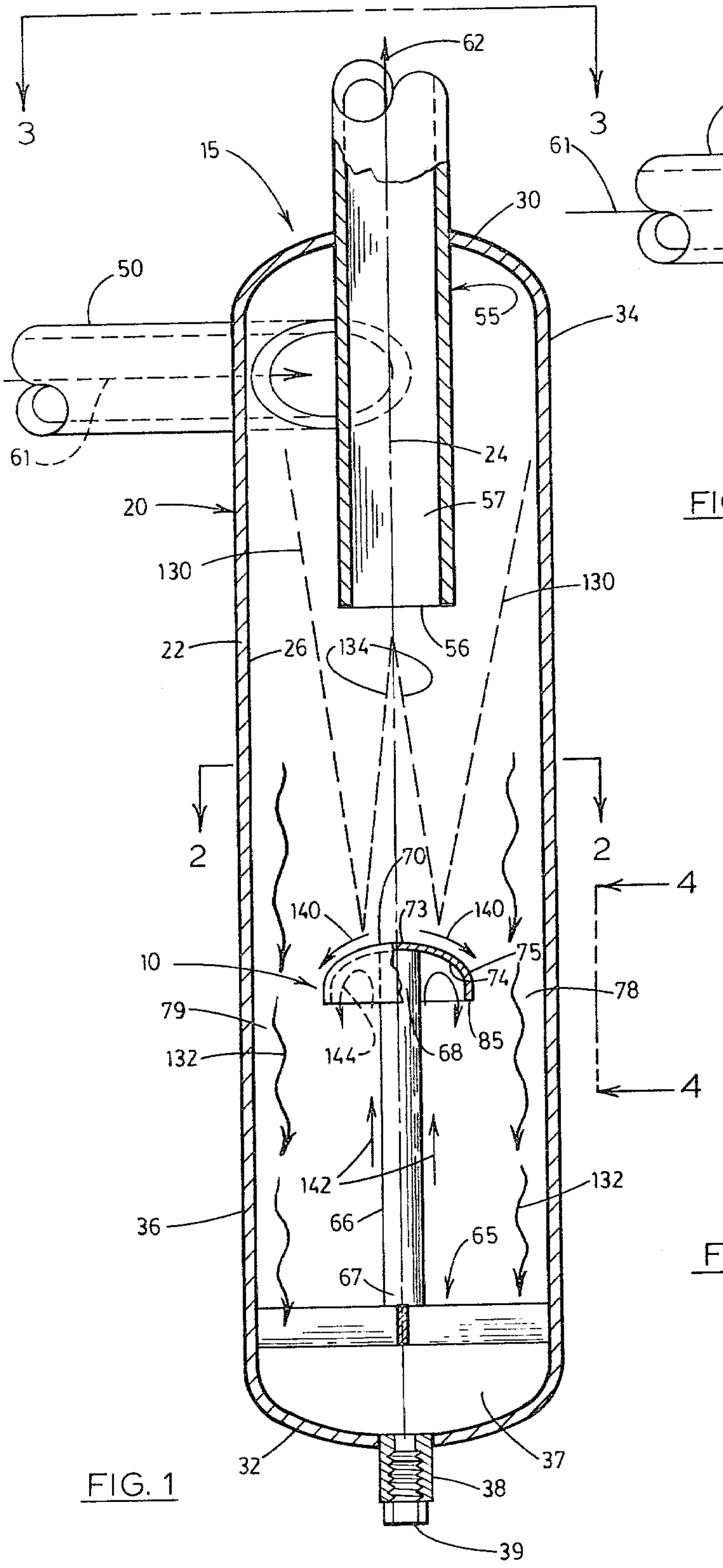
FIG. 1 is a longitudinal section of a fluid separator having a first form of a reaction member embodying the principles of the present invention.
Figure 3:
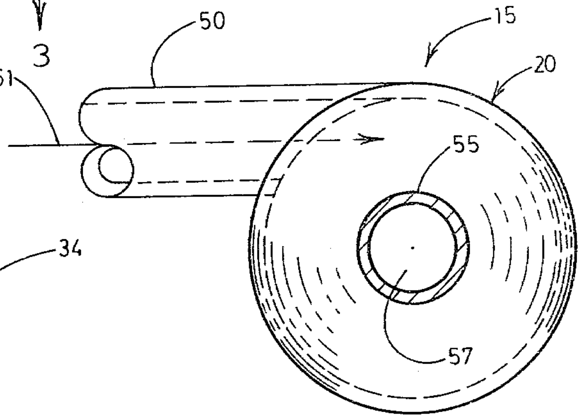
FIG. 3 is an axial end view of the separator taken from the position of line 3—3 of FIG. 1.
Figure 2:
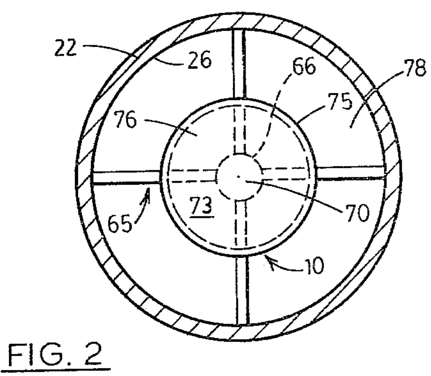
FIG. 2 is a transverse section of the separator taken on line 2—2 of FIG. 1.

Referring with greater particularity to the drawings, a first form of reaction member 10 embodying the principles of the present invention is shown in FIGS. 1 and 2 disposed in a representative fluid separating device 15, best shown in FIGS. 1, 2, and 3. A description of the operation of a fluid separating device, which is similar to the device 15 and is provided with a reaction member disposed and functioning therein similarly to a reaction member of the present invention, is given in the above-mentioned U.S. Pat. No. 3,512,651, issued to the applicant on May 9, 1970. This patent describes in detail the proportions, disposition, and the swirl reflecting function of such a reaction member and only so much description is given herein as is necessary to an understanding of the subject invention.

The device 15 includes a circular vortexing chamber 20 having a cylindrical sidewall 22 having an axis 24 which is a longitudinal axis for the device. The sidewall provides a cylindrical inner surface 26 which is a surface of revolution about the axis. The device is supported in any suitable manner with the axis upwardly extended so that the chamber has a closed upper axial end 30 and a closed lower axial end 32, both ends being spherical segments. The chamber has an upper end portion 34 defined by the upper end and the adjacent section of the sidewall and has a corresponding lower end portion 36 which provides a receiver 37 downwardly therein. Typically, the lower end is provided with a central nipple 38, and a plug 39 is screw-threadably engaged in the nipple.

The device 15 has a horizontal, tubular inlet 50 mounted on the upper portion 34 adjacent to the upper end 30. The inlet opens through the sidewall 22 in a direction tangential to the axis 24. The device has a cylindrically tubular vortex finder 55 extending through the upper end concentrically with the surface 26 to an open lower end or outlet 56 disposed axially oppositely of the receiver and substantially below the inlet. The axis 24 thus extends between the outlet and the receiver 37 while the vortex finder provides an emitting passage 57 extending through it concentrically with the upper end portion. The respective portions of the inlet and of the vortex finder extending outwardly from the chamber are fragmentarily represented and are associated with corresponding arrows 61 and 62. The arrows 61 represent a stream of a fluid system being supplied to the device due to a pressure differential between the inlet and the vortex finder. The inlet directs the system into the chamber in a tangential direction and the pressure differential is created in any suitable manner. The system has at least two constituents of different specific gravities. Typically, the lighter constituent is a fluid, such as water, which is laden with particles, sand for example, which are a heavier and undesired constituent. The arrow 62 represents the substantially separated lighter constituent flowing out of the vortex finder.

The device 15 includes a cross-shaped bracket 65 rigidly mounted on the sidewall 22 adjacent to the lower end 32. The bracket has four arms extended radially inwardly from the sidewall to the axis 24 and rigidly interconnected thereat. The device includes a cylindrical mounting rod 66 which is concentric with the axis, has a lower end 67 fixedly mounted on the bracket, and extends upwardly from the bracket to an upper end 68 disposed somewhat above the receiver 37.

The reaction member 10 of the first form includes a concavo-convex body or plate 70 which is imperforate, is substantially circular as viewed along the longitudinal axis 24, and is concentric with the surface 26. The plate has an upper convex surface 73 and an opposite, substantially parallel, lower concave surface 74. These surfaces and the plate are semi-elliptical or ellipsoidal and have a minor axis substantially coincident with the longitudinal axis so that the surfaces are surfaces of revolution about the longitudinal axis and are substantially concentric with the sidewall 22. The lower surface is rigidly mounted on the upper end 68 of the rod 66 so that the reaction member is mounted in the chamber between the outlet 56 and the receiver 37 with the convex upper surface disposed toward the outlet and the vortex finder 55 and so that the concave lower surface is disposed toward the receiver. The plate is, therefore, mounted between the vortex finder and the lower portion 36 and is disposed transversely of the longitudinal axis 24 and concentrically of the vortexing chamber 20. The plate has a circular periphery 75 disposed toward the sidewall and concentric therewith so that the plate defines an annular opening 78 therepast adjacent to the sidewall. The plate has a peripheral portion 77 inwardly of the periphery. The peripheral portion and the upper surface slope downwardly and outwardly to the periphery from the longitudinal axis 24. The plate and the lower end portion 32 of the chamber 20 define a settling compartment 79 therein.

The reaction member 10 of the first form includes a cylindrical flange 85 concentric with the plate 70 and extended downwardly from the periphery 75 for a distance which is relatively short in relation to the length of the rod 66. Preferably, a standard semi-elliptical piping cap is utilized as the reaction member so that the plate and flange are integrally constructed.

SECOND FORM

Figure 4:
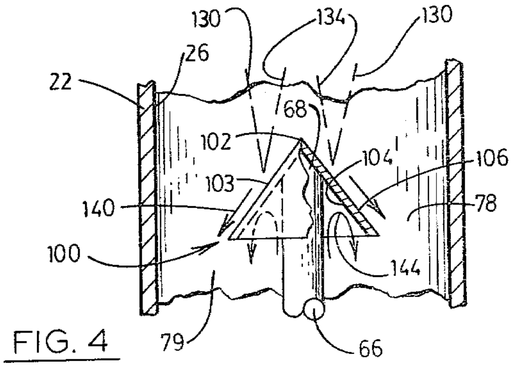
FIG. 4 is a fragmentary longitudinal section of a separator having a second form of reaction member embodying the principles of the present invention taken from a position corresponding to that of line 4—4 of FIG. 1.

A second form of reaction member of the present invention is illustrated in FIG. 4 and indicated by the numeral 100. The member is a concavo-convex plate of substantially conical shape having an upwardly disposed apex 102. The plate provides a convex upper surface 103 which slopes downwardly and outwardly from the apex, a concave lower surface 104, and a peripheral portion 106. These three elements correspond respectively to the surfaces 73 and 74 and the portion 76 of the first form 10 of the present invention. The second form of reaction member is disposed in the fluid separating device 15 substantially identical with the first form, the lower surface of the second form being fixedly mounted on the upper end 68 of the rod 66 with the apex of the member disposed toward the vortex finder 55 and with the axis of the conical plate coincident with the axis 24. The second form is thus concentrically mounted in the vortexing chamber 20 with its upper surface, its lower surface, and its peripheral portion disposed in relation to the elements of the fluid separating device substantially as the corresponding elements of the first form are disposed to the elements of the device.

THIRD FORM

Figure 5:
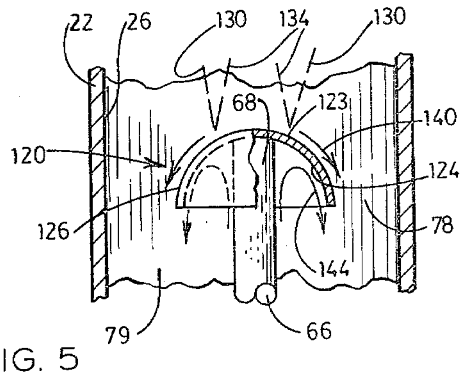
FIG. 5 is a fragmentary longitudinal section, similar to FIG. 3, of a separator having a third form of reaction member embodying the principles of the present invention.

A third form of reaction member of the present invention is illustrated in FIG. 5 and indicated by the numeral 120. The third form is a substantially hemispherical plate, such as a standard piping cap, having an upper convex surface 123 and a lower concave surface 124 corresponding respectively to the surfaces 71 and 72 of the first form 10. The plate of the third form is, therefore, concavo-convex and has a peripheral portion 126, corresponding to the portion 76, and a downwardly disposed, circular open end. The lower surface of the hemispherical plate is fixedly mounted on the upper end 68 of the rod 66 with the circular open end substantially concentric with the sidewall 22 so that the plate and the upper surface slope downwardly and outwardly from the axis 24. In relation to the elements of the device 15, the upper surface, the lower surface, and the peripheral portion of the third form of reaction member are disposed similarly to the disposition of the corresponding surfaces and portion of the first form of reaction member.

OPERATION

The operation of the described embodiments of the present invention is believed to be clearly apparent and is briefly summarized at this point. A previously described fluid system having a fluid, lighter constituent and a particulate, heavier constituent enters the device 15, as indicated by the arrows 61 in FIGS. 1 and 3, through the inlet 50 tangentially of the vortexing chamber 20 and, as shown in FIGS. 1, 2, 4, and 5, swirls downwardly about the vortex finder 55 and the longitudinal axis 24. The lighter constituent swirls in a direction radially inwardly of the chamber toward the reaction member 10, 100, or 120, in the area of the chamber indicated by the dash lines 130. This direction is, of course, centrally of the chamber. The swirling movement of the system urges the heavier constituent centrifugally in a direction outwardly of the chamber where centrifuged portions of the heavier constituent, indicated by the arrows 132, descend gravitationally through the annular opening 78 which admits this constituent into the settling compartment 79 and into the lower portion 36 and the receiver 37. At the reaction member, its upper surfaces 73, 103, or 123 reflect the inwardly swirling fluid upwardly along the axis 24 toward the vortex finder 55 in the area of the chamber, as indicated by the dash lines 134. The upwardly swirling fluid continues to move centrally of the chamber and toward and into the outlet 56. Centrifugal separation continues during this upwardly reflected swirl, with any heavier constituent therein being thrown outwardly for descent into the settling chamber together with the portion separated from the downwardly swirling fluid, while the substantially purified lighter constituent enters the emitting passage 57 and exits the device 15 as indicated by the arrows 62.

The above-described separating and reflecting actions are similar to those occurring in a device having a planar reaction member as disclosed in the above-mentioned U.S. Pat. No. 3,512,651. However, with a concavo-convex reaction member 10, 100, or 120 of the present invention, any particles of the heavier constituent which tend to settle upon the convex upper surface 73, 103, or 123 are gravitationally urged downwardly and outwardly thereof, as indicated by the arrows 140, and are shed into the opening 83 to descend into the receiver 37 with other particles separated from the lighter constituent. As a result, such particles are removed from the swirling lighter constituent and do not contaminate this desired constituent as it is reflected toward the outlet 56.

The portions of the fluid system in the settling chamber 79 and receiver 37 are relatively quiescent since there is relatively little flow through the lower portion 36 of the chamber 20 and since any residual swirling movement therein is dissipated by the bracket 65. However, the entry of the separated heavier constituent into the receiver and normal molecular motion of the constituents therein result in a certain amount of these constituents moving upwardly in the receiver as indicated by the arrows 142. This upward movement tends to carry a portion of the previously separated particles of the heavier constituent from the receiver so that these particles seek to move upwardly past the reaction member 10, 100, or 120 and through the opening 78. However, such upward movement brings many of the upwardly moving particles into the vicinity of the concave lower surface 74, 104, or 124 and this surface obstructs these particles and guides them downwardly, as indicated by the arrows 144, toward the receiver. These particles, together with other separated particles, are removed from the receiver in any suitable manner, as through the nipple 38 by removal of the plug 39 from time to time.

It is thus apparent that a concavo-convex reaction member 10, 100, or 120 of the present invention reflects, as indicated by the dash lines 134, a swirling lighter constituent of a fluid system without accumulating a heavier constituent which is shed from the member as indicated by the arrows 140. The member, due to its concave surface 74, 104, or 124, obstructs movement of a separated heavier constituent from the receiver 37. Such a reaction member is of simple and economical construction and can be mounted, instead of a prior art planar reaction member, on a rod corresponding to the rod 66 of an existing configuration of fluid separating device similar to the device 15. This substitution does not otherwise alter such existing device. A concavo-convex reaction member of the present invention does not cause any greater restriction to fluid flow when reflecting a swirl indicated by the lines 130 than does a prior art planar reaction member. As a result, the improved separation achieved by the present invention is obtained without increased pressure drop between the inlet 50 and the emitting passage 57.

Although the invention herein has been shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. A device for separating particles from a particle-laden fluid comprising a vortexing chamber having a sidewall which provides an inwardly disposed surface of revolution concentric to a longitudinal axis for the chamber, a closed upper axial end, and a closed lower axial end; a downwardly open, tubular vortex finder extended through said upper end concentrically of the axis, the upper end portion of the sidewall having an inlet adjacent to the vortex finder disposed to direct the fluid system tangentially into the chamber to swirl about the vortex finder for centrifuging of the particles radially outwardly and descent toward the lower portion along the sidewall while fluid separated from the particles swirls downwardly between the vortex finder and the lower portion radially inwardly and then upwardly along the axis and out of the vortex finder; and a reaction member comprising a circular plate mounted concentrically of the axis between the vortex finder and the lower end portion of the chamber and defining a settling compartment between the reaction member and the closed lower end portion of the chamber, said reaction member having an upwardly disposed convex surface of revolution about the axis and a downwardly disposed concave surface of revolution concentrically about the axis, the convex surface reflecting the inwardly swirling fluid toward the vortex finder and sloping outwardly and downwardly to shed particles gravitationally therefrom, and the concave surface downwardly redirecting movement of particles from the lower portion of the compartment upwardly to the reaction member for settling in the compartment.

2. In a device for separating a fluid system containing at least two phases having different specific gravities, said device having a vortexing chamber having closed upper and lower end portions and a sidewall having an inwardly disposed surface of revolution concentric to a longitudinal axis for the chamber, a tubular vortex finder extended concentrically through the upper end portion of the vortexing chamber and having an emitting passage concentrically therethrough; and means for supplying such a fluid system into the upper end portion of the vortexing chamber tangentially to said axis so that the fluid swirls downwardly in the chamber to centrifuge portions of the heavier phase outwardly for descent in the chamber to the lower end portion thereof and said fluid then swirls upwardly through the emitting passage of the vortex finder, a circular concavo-convex reaction plate mounted transversely of said axis concentrically of the chamber in downwardly spaced relation to the vortex finder and with the lower end portion of the chamber defining a settling compartment in the lower end portion, said plate being circumscribed by an annular opening therepast adjacent to said sidewall to admit the fluid containing the centrifuged portions of said heavier phase to the compartment for gravitational descent therein downwardly adjacent to the sidewall and thence upwardly centrally of the compartment, said plate having an upwardly disposed convex surface gravitationally to shed portions of the heavier phase which settle thereon for descent through the annular opening into the compartment and a downwardly disposed concave surface downwardly to redirect portions of the heavier phase seeking to move upwardly from the compartment past the plate.

* * * * *